United States Patent [19]

DeHaan, III et al.

[11] Patent Number: 5,295,755
[45] Date of Patent: Mar. 22, 1994

[54] SHOCK MOUNT

[75] Inventors: Richard DeHaan, III, Jenison; David M. Boruta, Grand Haven; George B. Byma, Jenison, all of Mich.

[73] Assignee: Herman Miller, Inc., Zeeland, Mich.

[21] Appl. No.: 805,491

[22] Filed: Dec. 9, 1991

[51] Int. Cl.⁵ ............ F16F 7/12; F16F 9/30; F16B 12/04; F16B 47/00
[52] U.S. Cl. .................. 403/291; 403/226; 403/228; 403/266; 248/205.3; 267/141
[58] Field of Search ........... 403/265, 266, 291, 225, 403/226, 228, 220; 267/141, 153, 292; 248/205.3, 298, 638

[56] References Cited

U.S. PATENT DOCUMENTS

| | | | |
|---|---|---|---|
| 1,830,117 | 11/1931 | Lee | 267/141 |
| 1,936,113 | 11/1933 | Jelliffe | 45/137 |
| 2,241,026 | 5/1941 | Wylie | 403/220 X |
| 2,969,831 | 1/1965 | Eames | 403/265 |
| 3,008,764 | 11/1961 | Pile | 297/306 |
| 3,477,674 | 11/1969 | Schaller | 267/153 X |
| 3,625,501 | 12/1971 | Hein | 267/141 X |
| 3,767,259 | 10/1973 | Blake et al. | 297/250 |
| 4,338,151 | 7/1982 | Hutter, III | 248/205.3 X |
| 4,806,437 | 2/1989 | Yokoi et al. | 267/141 X |
| 5,017,328 | 5/1991 | Mazurek | 267/141 X |

Primary Examiner—Randolph A. Reese
Assistant Examiner—Christopher J. Novosad
Attorney, Agent, or Firm—Willian Brinks Hofer Gilson & Lione

[57] ABSTRACT

A shock mount is used for mounting a first member of a piece of furniture to a second member thereof. The shock mount includes an elastic portion and a metal portion secured to the elastic portion. The metal portion has an exposed surface of a shape which conforms to the first furniture member. The elastic portion is secured to the second furniture member, the exposed surface of the metal portion is adhesively secured to the first furniture member, and the elastic portion absorbs various loads imparted by the first and second furniture members.

30 Claims, 4 Drawing Sheets

SHOCK MOUNT

BACKGROUND OF THE INVENTION

The present invention relates generally to furniture, and more particularly, to a load-absorbing shock mount for securing separate members of a piece of furniture together.

Shock mounts are typically interposed between the backrest of a chair and a support arm for absorbing tensile and/or shear stress imparted by the backrest and support arm. Prior art shock mounts are typically made of rubber and have a surface which is adhesively secured to the backrest to avoid using fasteners such as screws, bolts, or the like which extend through the backrest and tend to be unattractive and uncomfortable to a user. The rubber surface is often treated with a sulfuric acid etch to enhance the bonding properties thereof. However, such a bond tends to fail with high tensile or torsional loads.

U.S. Pat. No. 3,008,764 to Pile discloses such a shock mount which is adhesively secured to the backrest of chair. The shock mount in Pile includes a pair of resilient members having an annular groove formed in a base thereof for receiving and retaining a bonding agent.

SUMMARY OF THE INVENTION

Briefly stated, the invention is directed to a shock mount for mounting a first member of a piece of furniture to a second member thereof. The shock mount includes an elastic portion and a metal portion secured to the elastic portion. The elastic portion has mounting means for securing said portion to the second furniture member, and the metal portion has an exposed surface of a shape which conforms to the first furniture member for adhesively securing the metal portion to said first furniture member. Thus, the elastic portion absorbs various loads imparted by the first and second furniture members and the shock mount remains securely attached to said members.

In a preferred embodiment, the elastic portion of the shock mount is made of rubber and a first metal plate and a second metal plate are molded therewith. The first metal plate has an exposed surface which is coated with zinc phosphate to provide an enhanced bonding surface for applying an adhesive thereto. The second metal plate is spaced apart from the first metal plate and has a threaded hole therein for receiving a threaded fastener to secure the second plate to the second furniture member. Thus, the first plate is adhesively secured to the first furniture member, the second plate is secured to the second furniture member by the threaded fastener, and the elastic portion absorbs various loads imparted by the first and second furniture members.

To enhance load-absorption, the second metal plate preferably has a plurality of holes therein spaced apart from the threaded hole, and the rubber portion of the shock mount spans through said holes. In addition, the rubber portion preferably has a hole therein in alignment with the threaded hole in the second metal plate which extends past the second metal plate toward the first metal plate.

The present invention provides significant advantages over other shock mounts. An exposed metal plate provides an enhanced bonding surface for adhesively securing the shock mount to the first furniture member. At the same time, the second metal plate is allowed to move relative to the first plate and the rubber portion of the shock mount is deformable to absorb various loads exerted on the shock mount from the first and second furniture members.

The present invention, together with further objects and advantages, will be best understood by reference to the following detailed description taken in conjunction with the accompanying drawings.

DETAILED DESCRIPTION OF THE PREFERRED EMBODIMENTS

Figure 1:
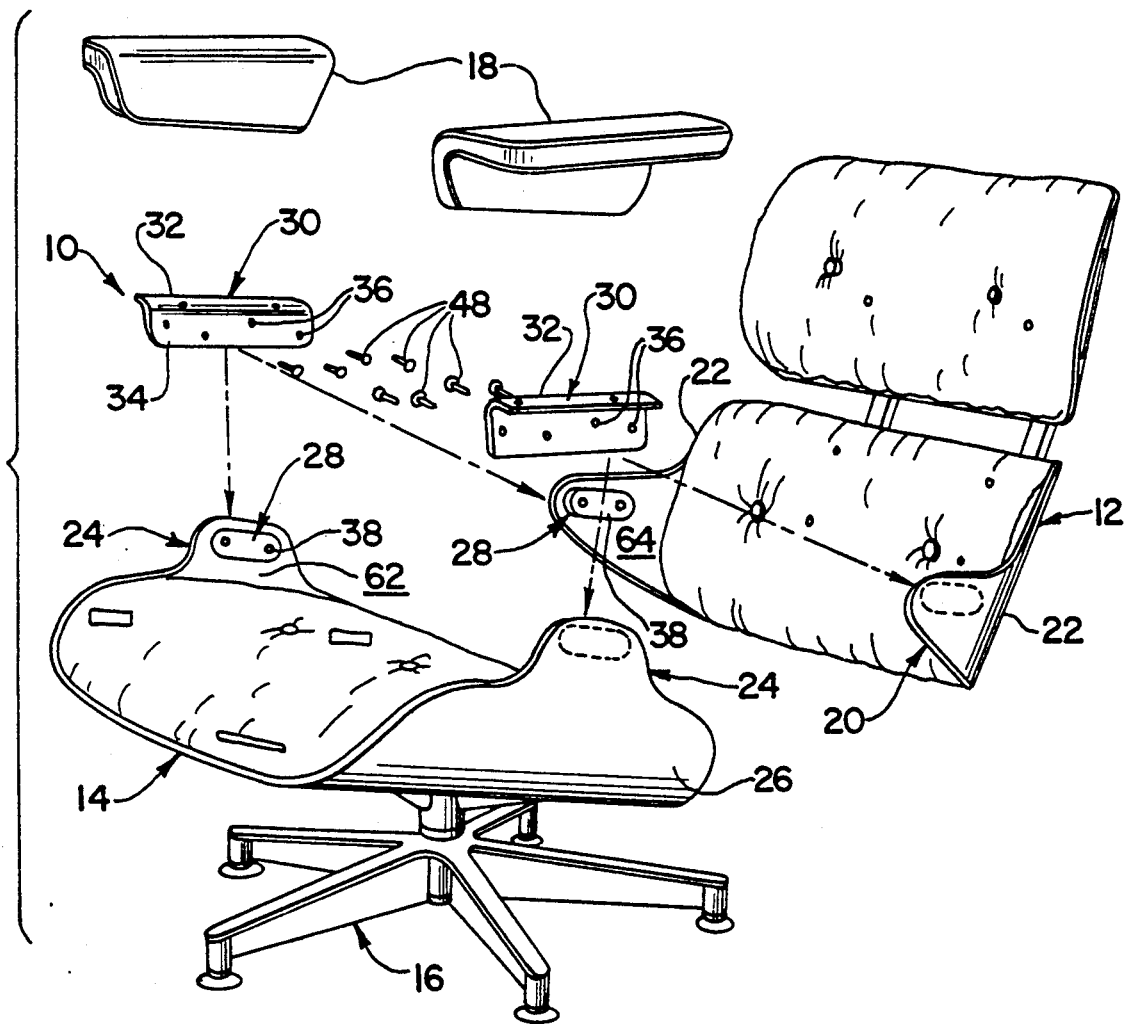
FIG. 1 is a perspective exploded view of a chair assembly showing a preferred embodiment of a plurality shock mounts used to interconnect a backrest to a seat.
Figure 2:
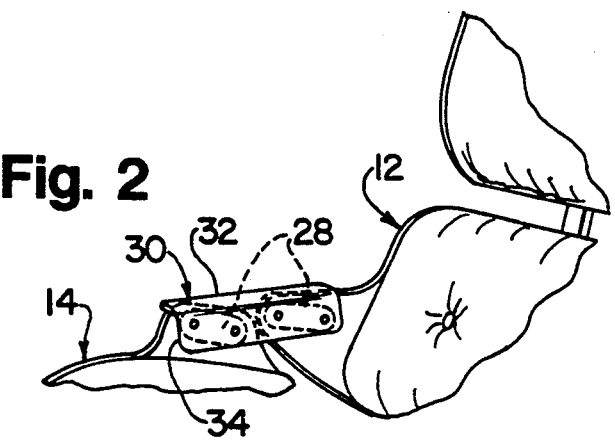
FIG. 2 is a fragmentary, perspective view of the invention showing a backrest and seat mounted together by two shock mounts.

Referring to the drawings, FIG. 1 shows a preferred embodiment of the invention assembled to an Eames ® lounge chair 10 which is manufactured and sold by Herman Miller, Inc. The chair 10 includes a backrest 12, a seat 14 supported by a stand 16, and a pair of armrests 18. The backrest 12 has a pair of ears 20 extending perpendicularly forward from side edges 22 thereof, and the seat 14 has a pair of ears 24 extending upward from side edge portions 26 thereof. The backrest ears 22 and seat ears 24 are preferably constructed of wood or fiberglass, although any suitable material compatible with a bonding agent can be used.

Figure 3:
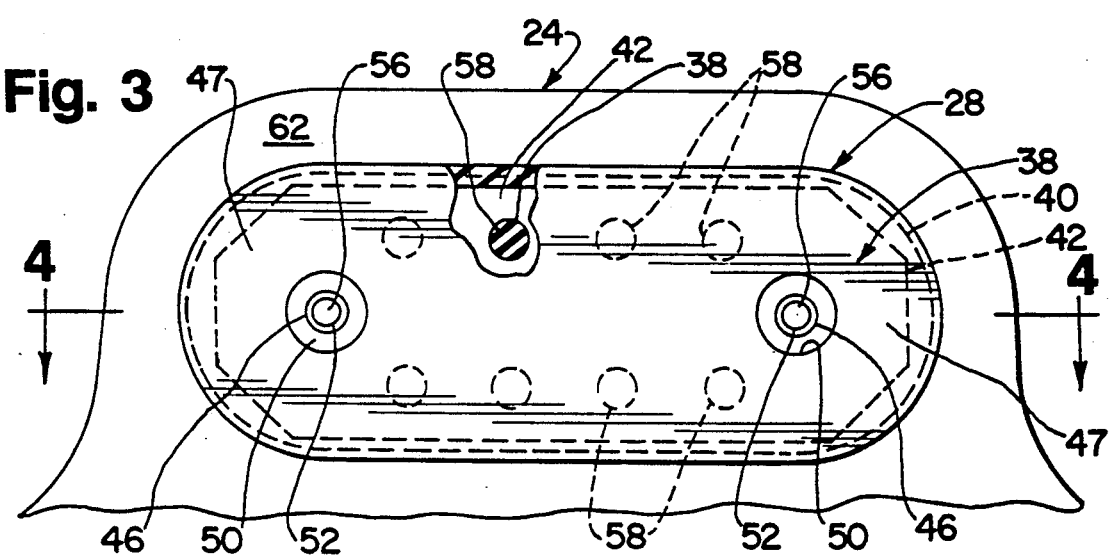
FIG. 3 is a top view of a shock mount.
Figure 4:
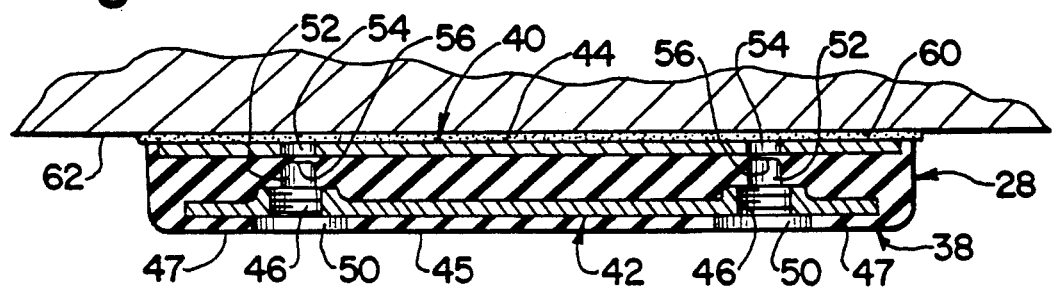
FIG. 4 is a cross-sectional view of the shock mount taken along the line 4—4 in FIG. 3.

A plurality of elongated shock mounts 28 and support members 30 are provided for mounting the backrest 12 to the seat 14. The support members 30 include a substantially horizontal plate 32 for securing the armrests 18 thereto and a substantially vertical flange 34 having a plurality of holes 36 therein. As best shown in FIGS. 3 and 4, the shock mounts 28 include an elastic portion 38 having a first metal plate 40 and a second metal plate 42 molded therewith. The elastic portion 38 is preferably made of rubber and the plates 40 and 42 are preferably made of steel. The first metal plate 40 is preferably the same shape as the periphery of the elastic portion 38 and has an exposed surface 44 coated with zinc phosphate (not shown) to provide an enhanced bonding surface. Other suitable bonderizing treatments can be applied to the exposed surface 44 of the first metal plate 40 to create an enhanced bonding surface. The second metal plate 42 is parallel to and spaced apart from the first metal plate 40 and surface 45 of the elastic portion 38. To allow the second plate 42 to be mounted to the flange 34 of the corresponding support member 30, the second plate 42 has a pair of spaced apart threaded holes 46 therein adjacent end portions 47 of the shock mount 28 for receiving threaded fasteners 48 (FIG. 1).

The elastic portion 38 has a pair of countersunk holes 50 therein in alignment with the holes 46 in the second plate 42 to allow the fasteners 48 to be inserted therein, and a pair of holes 52 extending past the second plate 42 toward the first plate 40. In addition, the first plate 40 has a pair of holes 54 in alignment with the holes 52 in the elastic portion 38 to create a relatively thin wall 56 of elastic material between the holes 52 and 54. The holes 54 provide a reference point for tapping the holes 52, and the walls 56 prevent adhesive from reaching the holes 52. The second plate 42 also has a plurality of holes 58 therein spaced apart from the threaded holes 46, and the elastic portion 38 extends through the holes 58.

To assemble the backrest 12 to the seat 14, a bonding agent 60, preferably Lord Chemlock ® 252 adhesive, is applied to the exposed surfaces 44 of four shock mount plates 40. A pair of shock mounts 28 are adhesively secured to an inside surface 62 of the backrest ears 20 and a pair of shock mounts 28 are adhesively secured to an inside surface 64 of the seat ears 24. The flanges 34 of the corresponding support members 30 are mounted to the shock mounts 28 by inserting the threaded fasteners 48 through the holes 36 in the flanges 34 and into the threaded holes 46 in the second plate 42. Thus, the shock mounts 28 are securely bound to the backrest and seat ears 20 and 24, and the elastic portions 38 thereof absorb various loads imparted by the seat 14 and backrest 12. The foregoing configuration is especially suited for absorbing torsional and/or shear stress imparted on the shock mounts 28.

Figure 5:
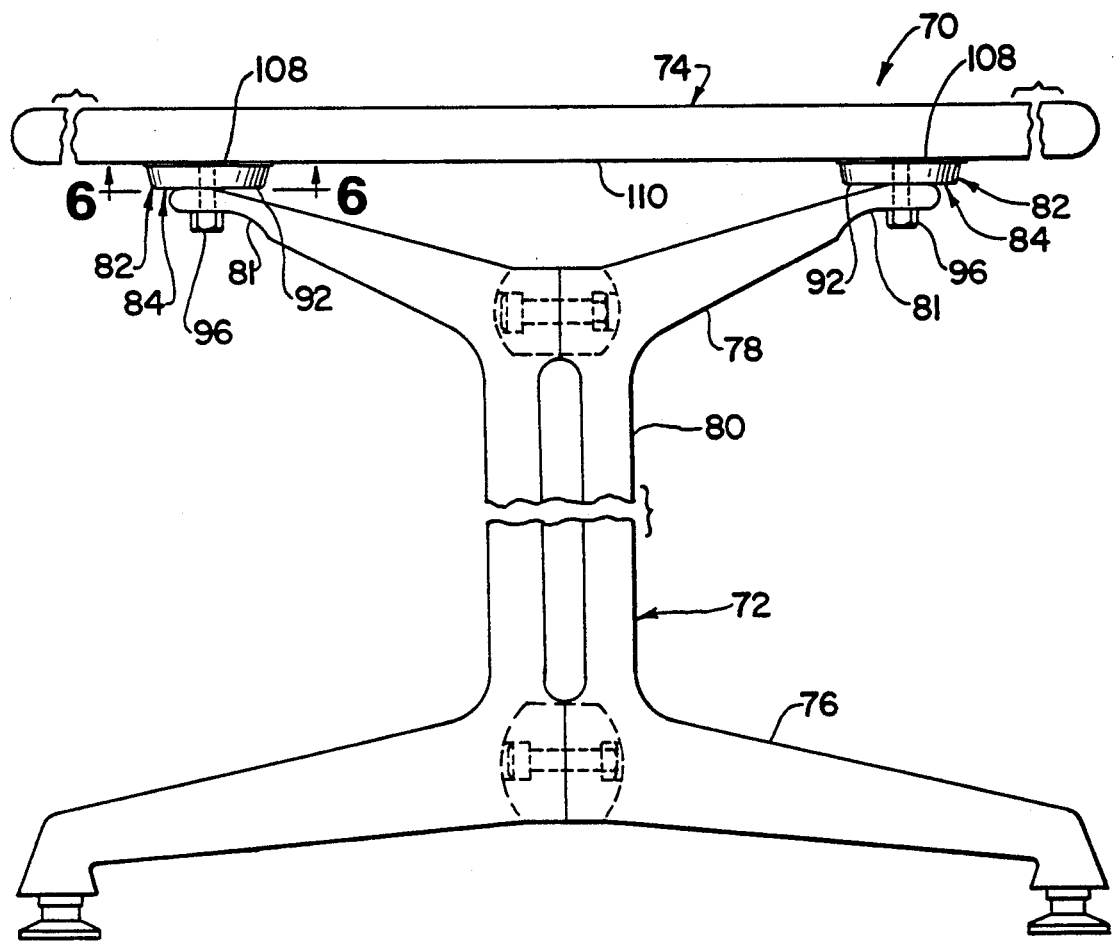
FIG. 5 is a front view of a table assembly showing an alternative embodiment of the shock mounts.
Figure 6:
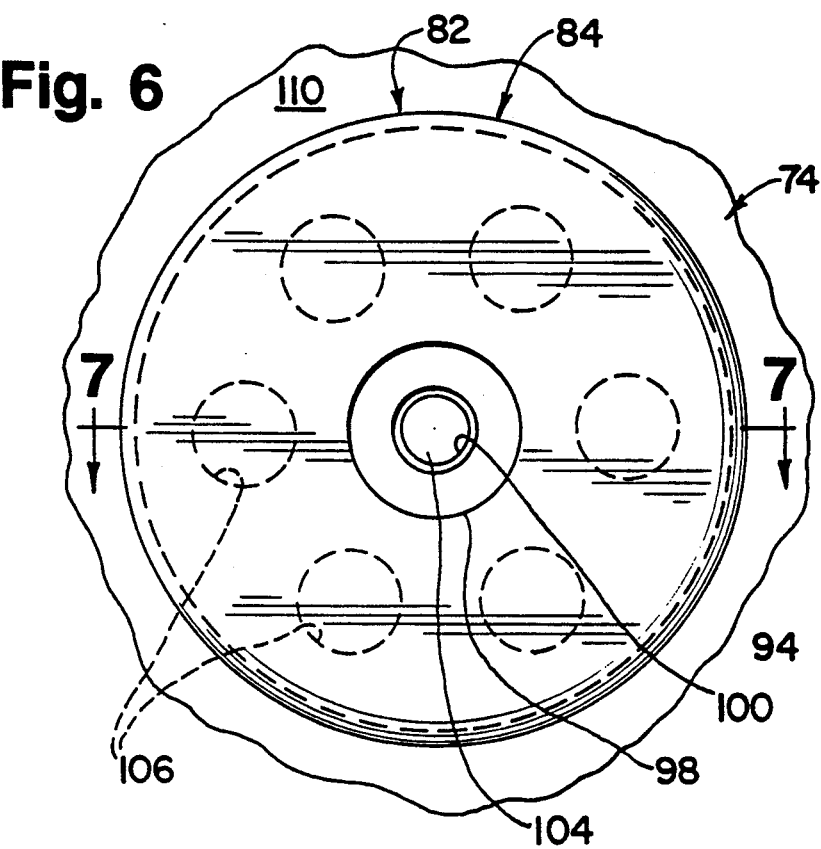
FIG. 6 is a bottom view of a shock mount taken along the line 6—6 in FIG. 5.
Figure 7:
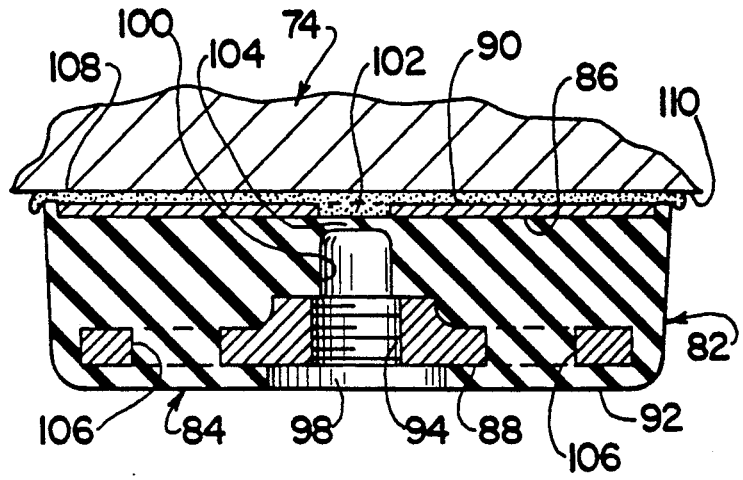
FIG. 7 is a cross-sectional view of the shock mount taken along the line 7—7 in FIG. 6.

FIGS. 5-7 illustrate an alternative embodiment of the invention. In FIG. 5, a table 70 includes a stand 72 which supports a horizontal slab 74. The stand 72 includes a plurality of legs 76 and arms 78 extending radially outward from a post 79. The slab 74 is preferably constructed of wood, although any suitable material compatible with a bonding agent can be used.

The slab 74 is mounted to end portions 81 of the arms 78 by a plurality of cylindrical shock mounts 82. As best shown in FIGS. 6 and 7, the shock mounts 82 include an elastic portion 84 having a first metal plate 86 and a second metal plate 88 molded therewith. The elastic portion 84 is preferably made of rubber and the plates 86 and 88 are preferably made of steel. The first plate 86 is preferably circular and has an exposed surface 90 coated with zinc phosphate (not shown) to provide an enhanced bonding surface. The second plate 88 is parallel to and spaced apart from the first plate 90 and surface 92 of the elastic portion 84. To allow the second plate 88 to be mounted to the end portion 81 of the corresponding arm 78, the second plate 88 has a threaded hole 94 in substantially the center thereof for receiving a threaded fastener 96 (FIG. 5).

The elastic portion 84 has a countersunk hole 98 therein in alignment with the hole 94 in the second plate 88 to allow the fastener 96 to be inserted therein, and a hole 100 extending past the second plate 88 toward the first plate 86. In addition, the first plate 86 has a hole 102 in alignment with the hole 100 in the elastic portion 84 to create a relatively thin wall 104 of elastic material between the holes 100 and 102. The second plate 88 also has a plurality of holes 106 therein through which the elastic portion 84 extends. The holes 106 are preferably spaced apart an equal distance from each other and from the threaded hole 94.

To assemble the slab 74 to the stand 72, the shock mounts 82 are threadably fastened to the arms 78 of the stand 72 by the fasteners 96 such that the exposed surfaces 90 of the plates 86 are substantially horizontal and facing upward. A bonding agent 108, preferably Lord Chemlock ® 252 adhesive, is applied to the exposed surfaces 90, and the slab 74 is placed thereon such that an underside 110 of the slab 74 is adhesively secured to the shock mounts 82. Thus, the shock mounts 82 are securely bound to the slab 74, and the elastic portions 84 thereof absorb various loads imparted by the slab 74 and stand 72. The foregoing configuration is especially suited for absorbing tensile stress imparted on the shock mounts 82.

The shock mounts 28 and 82 can be used in like fashion for mounting any member of a piece of furniture directly or indirectly to another member thereof. The elastic portions 38, 84 and the metal plates 40, 42, 86, 88 can comprise various shapes and sizes, although at least a portion of the first plates 40 and 86 must be exposed for applying an adhesive thereto. Furthermore, any suitable mounting means can be used for mounting the non-adhesive portion of the shock mounts 28 and 82 to a corresponding furniture member, such as using one or more threaded inserts or the like.

Thus, a shock mount for absorbing various loads imparted thereon by various pieces of furniture is provided which has an enhanced bonding surface for adhesively securing the shock mount to a piece of furniture.

Although the present invention has been described with reference to preferred embodiments, workers skilled in the art will recognize that many changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. A shock mount for mounting a first member of a piece of furniture to a second member thereof, the shock mount comprising:
    an elastic portion having mounting means for securing said portion to the second furniture member; and
    a metal portion secured to the elastic portion, said metal portion having an exposed surface of a shape which conforms to the first furniture member; whereby the metal portion is adhesively secured to said first furniture member;
    whereby the elastic portion absorbs various loads imparted by the first and second furniture members and the shock mount remains securely attached to said members.

2. The shock mount of claim 1, wherein the elastic portion is made of rubber.

3. The shock mount of claim 1, wherein the exposed surface of the metal portion is coated with zinc phosphate.

4. The shock mount of claim 1, wherein the metal portion is molded with the elastic portion.

5. The shock mount of claim 1, wherein the mounting means comprises a second metal portion spaced apart from the metal portion having an exposed surface, said second metal portion having a threaded hole therein for receiving a fastener.

6. The shock mount of claim 5, wherein the metal portion having an exposed surface comprises a first metal plate, and the second metal portion comprises a second metal plate.

7. The shock mount of claim 6, wherein the second metal plate has a plurality of holes therein spaced apart from said threaded hole, the elastic portion of the shock mount spanning through said holes.

8. The shock mount of claim 6, wherein the elastic portion has a hole therein in alignment with the threaded hole in the second metal plate.

9. A shock mount for mounting a first member of a piece of furniture to a second member thereof, the shock mount comprising:

an elastic portion having a first metal plate and a second metal plate molded therewith, said first metal plate having an exposed surface for applying a bonding agent thereto to adhesively secure the first plate to the first furniture member, and said second metal plate being spaced apart from the first metal plate and having a threaded hole therein for receiving a fastener to secure said second plate to the second furniture member, whereby the first plate is adhesively secured to the first furniture member, the second plate is secured to the second furniture member by the fastener, and the elastic portion absorbs various loads imparted by the first and second furniture members.

10. The shock mount of claim 9, wherein the elastic portion is made of rubber.

11. The shock mount of claim 9, wherein the exposed surface of the first metal plate is coated with zinc phosphate.

12. The shock mount of claim 9, wherein the second metal plate has a plurality of holes therein spaced apart from the threaded hole, the elastic portion of the shock mount spanning through said holes.

13. The shock mount of claim 9, wherein the elastic portion has a hole therein in alignment with the threaded hole in the second metal plate, said hole in the elastic portion extending past the second metal plate toward the first metal plate.

14. The shock mount of claim 9, wherein the elastic portion and first and second plates of the shock mount are elongated.

15. The shock mount of claim 9, wherein the elastic portion is substantially cylindrical and the first and second plates are substantially circular.

16. A shock mount for mounting a first member of a piece of furniture to a second member thereof, the shock mount comprising:

a rubber portion having a first metal plate and a second metal plate molded therewith, said first metal plate having an exposed surface coated with zinc phosphate, and said second metal plate being spaced apart from the first metal plate and having a threaded hole therein for receiving a fastener to secure said second plate to the second furniture member, whereby the first plate is adhesively secured to the first furniture member, the second plate is secured to the second furniture member by the fastener, and the elastic portion absorbs various loads imparted by the first and second furniture members.

17. The shock mount of claim 16, wherein the second metal plate has a plurality of holes therein spaced apart from the threaded hole, the elastic portion of the shock mount spanning through said holes.

18. The shock mount of claim 17, wherein the elastic portion has a hole therein in alignment with the hole in the second metal plate, said hole in the elastic portion extending past the second metal plate toward the first metal plate.

19. The shock mount of claim 16, wherein the rubber portion and first and second plates of the shock mount are elongated.

20. The shock mount of claim 16, wherein the rubber portion is substantially cylindrical and the first and second plates are substantially circular.

21. A furniture assembly comprising:

a first furniture member;

a second furniture member; and a shock mount connecting said first furniture member to said second furniture member, said shock mount having an elastic portion and a metal portion secured to the elastic portion, said metal portion having an adhesive layer on a surface thereof in contact with the first furniture member to bond the shock mount to the furniture member;

whereby the elastic portion absorbs various loads imparted by the first and second furniture members and the shock mount remains securely attached to said members.

22. The furniture assembly of claim 21 wherein the elastic portion is made of rubber.

23. The furniture assembly of claim 21 further comprising a coating of zinc phosphate applied to the surface of the metal portion prior to application of the adhesive.

24. The furniture assembly of claim 21 wherein the metal portion is molded with the elastic portion.

25. The furniture assembly of claim 21 further comprising a second metal portion spaced apart from the metal portion having an exposed surface.

26. The furniture assembly of claim 25 wherein the second metal portion has a threaded hole therein for receiving a fastener to mount the second furniture member thereto.

27. The furniture assembly of claim 26 wherein the metal portion to which the adhesive is applied comprises a first metal plate, and the second metal portion comprises a second metal plate.

28. The furniture assembly of claim 27 wherein the second metal plate has a plurality of holes therein spaced apart from said threaded hole, the elastic portion of the furniture assembly spanning through said holes.

29. The furniture assembly of claim 28 wherein the elastic portion has a hole therein in alignment with the threaded hole in the second metal plate.

30. The furniture assembly of claim 21 wherein the furniture assembly comprises a chair, said first furniture member being one of a seat frame and backrest frame and said second furniture member being the other of said seat frame and backrest frame.

* * * * *